US012783951B1

(12) United States Patent
Zancato et al.

(10) Patent No.: US 12,783,951 B1
(45) Date of Patent: Nov. 3, 2026

(54) ADAPTING PRE-TRAINED MACHINE LEARNING MODELS USING TARGET DATA SETS

(71) Applicant: Amazon Technologies, Inc., Seattle, WA (US)

(72) Inventors: Luca Zancato, Saonara (IT); Alessandro Achille, Arcadia, CA (US); Matthew Gianni Trager, New York, NY (US); Pramuditha Perera, Secausus, NJ (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 664 days.

(21) Appl. No.: 18/338,123

(22) Filed: Jun. 20, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,625,555 | B1 | 4/2023 | Zhiyanov et al. | |
| 2022/0383206 | A1 | 12/2022 | Luong | |
| 2024/0037416 | A1* | 2/2024 | Sun ...................... | G06N 3/0464 |
| 2024/0330673 | A1* | 10/2024 | Jeeveswaran ........ | G06V 20/582 |

OTHER PUBLICATIONS

Alessandro Achille, Aditya Golatkar, Avinash Ravichandran, Marzia Polito, and Stefano Soatto. "Lqf: Linear quadratic fine-tuning", Proceedings of the IEEE/CVF Conference on Computer Vision and Pattern Recognition (CVPR), 2021, pp. 15729-15739, (retrieved from arXiv:2012.11140v1, pp. 1-14, 2020).

Jean-Baptiste Alayrac, et al., "Flamingo: a visual language model for few-shot learning," Part of Advances in Neural Information Processing Systems 35 (NeurIPS 2022) Main Conference Track, 2022. pp. 1-21.

Andreas Blattmann, et al. "Semi-parametric neural image synthesis", 2022. arXiv:2204.11824v3, pp. 1-34.

Sebastian Borgeaud, et al. "Improving language models by retrieving from trillions of tokens,"arXiv:2112.04426v1, 2021, pp. 1-43.

(Continued)

*Primary Examiner* — Pei Yong Weng
(74) *Attorney, Agent, or Firm* — S. Scott Foster; Kowert, Hood, Munyon, Rankin & Goetzel, P.C.

(57) ABSTRACT

Pre-trained machine learning models may be adapted using target data sets. A target data set may be received and used to adapt the pre-trained machine learning model. Auxiliary items may be retrieved from an auxiliary data set based on a target item from the target data set. Respective labels for the auxiliary items can then be identified based on target items from the target data set. Those auxiliary items with respective labels that do not match a label of the target item can be retained and used to apply a contrastive loss function to update a backbone of the pre-trained machine learning model. A cross entropy loss function can be applied to update a classifier of the pre-trained machine learning model using the label identified for the target item.

20 Claims, 7 Drawing Sheets

(56) References Cited

OTHER PUBLICATIONS

Lukas Bossard, Matthieu Guillaumin, and Luc Van Gool. "Food-101—mining discriminative components with random forests". In European Conference on Computer Vision, 2014, pp. 1-16.
Pau Panareda Busto and Juergen Gall. "Open set domain adaptation". In 2017 IEEE International Conference on Computer Vision (ICCV), pp. 754-763, 2017.
Mathilde Caron, et al. "Emerging properties in self-supervised vision transformers," Proceedings of the IEEE/CVF International Conference on Computer Vision (ICCV), 2021, pp. 9650-9660.
Dian Chen, Dequan Wang, Trevor Darrell, and Sayna Ebrahimi. Contrastive test-time adaptation, Proceedings of the EEE/CVF Conference on Computer Vision and Pattern Recognition (CVPR), 2022, pp. 295-305.
Ting Chen, Simon Kornblith, Mohammad Norouzi, and Geoffrey Hinton. "A simple framework for contrastive learning of visual representations," Proceedings of the 37th International Conference on Machine Learning, PMLR 119:1597-1607, 2020.
Ting Chen, Saurabh Saxena, Lala Li, David J. Fleet, and Geoffrey Hinton. "Pix2seq: a language modeling framework for object detection," Published as a conference paper at ICLR 2022, pp. 1-17.
Wenhu Chen, Hexiang Hu, Chitwan Saharia, andWilliamW. "Cohen. Re-imagen: Retrieval-augmented text-to-image generator,"2022 ,arXiv:2209.14491v3, pp. 1-25 ..
Xiang Chen, et al. "Decoupling knowledge from memorization: Retrieval-augmented prompt learning", Part of Advances in Neural Information Processing Systems 35 (NeurIPS 2022) Main Conference Track, pp. 1-15.
Yuhua Chen, Wen Li, Christos Sakaridis, Dengxin Dai, and Luc Van Gool. "Domain adaptive faster r-cnn for object detection in the wild," Proceedings of the IEEE Conference on Computer Vision and Pattern Recognition (CVPR), 2018, pp. 3339-3348.
G. Cheng, J. Han, and X. Lu. "Remote sensing image scene classification: Benchmark and state of the art." Proceedings of the IEEE, 105(10):1865-1883, 2017.
Ekin D. Cubuk, Barret Zoph, Jonathon Shlens, and Quoc V. Le. "Randaugment: Practical automated data augmentation with a reduced search space," Proceedings of the IEEE/CVF Conference on Computer Vision and Pattern Recognition (CVPR) Workshops, 2020, pp. 702-703.
Matthias Delange, et al. "A continual learning survey: Defying forgetting in classification tasks". IEEE Transactions on Pattern Analysis and Machine Intelligence, pp. 1-20, 2021.
J. Deng, W. Dong, R. Socher, L.-J. Li, K. Li, and L. Fei-Fei. "ImageNet: a Large-Scale Hierarchical Image Database". Published in: 2009 IEEE Conference on Computer Vision and Pattern Recognition, pp. 1-8.
"Aditya Deshpande, et al. "A linearized framework and a new benchmark for model selection forfine-tuning", 2021, arXiv:2102.00084v1, pp. 1-14."
Alexey Dosovitskiy, et al. "An image is worth 16x16 words: Transformers for image recognition at scale," Published as a conference paper at ICLR 2021, arXiv:2010.11929v2, pp. 1-22.
Xuefeng Du, Zhaoning Wang, Mu Cai, and Yixuan Li. Vos: "Learning what you don't know by virtual outlier synthesis," Published as a conference paper at ICLR 2022, arXiv:2202.01197v4 , pp. 1-21.
Dong Gong, et al. "Memorizing normality to detect anomaly: Memory-augmented deep autoencoder for unsupervised anomaly detection," Proceedings of the IEEE/CVF International Conference on Computer Vision (ICCV), 2019, pp. 1705-1714.
Alex Graves, GregWayne, and Ivo Danihelka. "Neural turing machines," Neural turing machines, arXiv:1410.5401v2, 2014, pp. 1-26.
Ruiqi Guo, et al. "Accelerating largescale inference with anisotropic vector quantization." In Hal Daum'e III and Aarti Singh, editors, Proceedings of the 37th International Conference on Machine Learning, vol. 119 of Proceedings of Machine Learning Research, pp. 3887-3896. PMLR, Jul. 13-18, 2020.
Kaiming He, Haoqi Fan, Yuxin Wu, Saining Xie, and Ross Girshick. "Momentum contrast for unsupervised visual representation learning," Proceedings of the IEEE/CVF Conference on Computer Vision and Pattern Recognition (CVPR), 2020, pp. 9729-9738.
Grant Van Horn, et al. "The inaturalist challenge 2017 dataset. CoRR," abs/1707.06642, 2017, receiteved from arXiv:1707.06642v1, pp. 1-8.
Ying Jin, XimeiWang, Mingsheng Long, and JianminWang. "Minimum class confusion for versatile domain adaptation," Part of the Lecture Notes in Computer Science book series (LNIP,vol. 12366), 2019, pp. 1-17.
Jeff Johnson, Matthijs Douze, and Herve Jegou. "Billionscale similarity search with GPUs". IEEE Transactions on Big Data, 7(3):535-547, 2019 (arXiv:1702.08734v1, pp. 1-12).
Guoliang Kang, Lu Jiang, Yi Yang, and Alexander G Hauptmann. "Contrastive adaptation network for unsupervised domain adaptation," Proceedings of the IEEE/CVF Conference on Computer Vision and Pattern Recognition (CVPR), 2019, pp. 4893-4902.
Aditya Khosla, et al. Novel dataset for fine-grained image categorization. In First Workshop on Fine-Grained Visual Categorization, IEEE Conference on Computer Vision and Pattern Recognition, Colorado Springs, CO, Jun. 2011, pp. 1-2.
Prannay Khosla, et al. "Supervised contrastive learning," Part of Advances in Neural Information Processing Systems 33 (NeurIPS 2020), pp. 1-13.
Jonathan Krause, Michael Stark, Jia Deng, and Li Fei-Fei. "3d object representations for fine-grained categorization". Proceedings of the IEEE International Conference on Computer Vision (ICCV) Workshops, 2013, pp. 554-561.
Dong-Hyun Lee. "Pseudo-label: the simple and efficient semi-supervised learning method for deep neural networks." ICML 2013 Workshop, pp. 1-6.
Patrick Lewis, et al. "Retrieval-augmented generation for knowledge-intensive nlp tasks". In Advances in Neural Information Processing Systems, vol. 33, pp. 9459-9474. Curran Associates, Inc., Part of Advances in Neural Information Processing Systems 33 (NeurIPS 2020), pp. 1-16.
Junnan Li, Caiming Xiong, and Steven Hoi. Comatch: "Semisupervised learning with contrastive graph regularization," Proceedings of the IEEE/CVF International Conference on Computer Vision (ICCV), 2021, pp. 9475-9484.
Jian Liang, Dapeng Hu, and Jiashi Feng. "Do we really need to access the source data? source hypothesis transfer for unsupervised domain adaptation," Proceedings of the 37th International Conference on Machine Learning, PMLR 119:6028-6039, 2020.
Alexander Long, et al. "Retrieval augmented classification for long-tail visual recognition," Proceedings of the IEEE/CVF Conference on Computer Vision and Pattern Recognition (CVPR), 2022, pp. 6959-6969.
Mingsheng Long, et al. "Learning transferable features with deep adaptation networks," Proceedings of the 32nd International Conference on Machine Learning, PMLR 37:97-105, 2015.
Jiasen Lu, et al. "Unified-io: a unified model for vision, language, and multi-modal tasks," 2022, arXiv:2206.08916v2, pp. 1-33.
Zheda Mai, et al. "Online continual learning in image classification: an empirical survey," retrieved from arXiv:2101.10423v4, pp. 1-27, 2021.
S. Maji, J. Kannala, E. Rahtu, M. Blaschko, and A. Vedaldi. "Fine-grained visual classification of aircraft. Technical report," arXiv:1306.5151v1, pp. 1-6, 2013.
Malong Tech. "Imaterialist dataset," https://github.com/malongtech/imaterialist-product-2019, 1 page.
Antoine Miech, et al. "Thinking fast and slow: Efficient text-to-visual retrieval with transformers," Proceedings of the IEEE/CVF Conference on Computer Vision and Pattern Recognition (CVPR), 2021, pp. 9826-9836.
Giovanni Paolini, et al. "Structured prediction as translation between augmented natural languages." Published as a conference paper at ICLR 2021, arXiv:2101.05779v3, pp. 1-26.
Xingchao Peng, et al. "Moment matching for multi-source domain adaptation," Proceedings of the IEEE/CVF International Conference on Computer Vision (ICCV), 2019, pp. 1406-1415.
Xingchao Peng, et al. "VisDA: The visual domain adaptation challenge," arXiv:1710.06924v2, pp. 1-17, 2017.

(56) References Cited

OTHER PUBLICATIONS

Ariadna Quattoni and Antonio Torralba. "Recognizing indoor scenes". In 2009 IEEE Conference on Computer Vision and Pattern Recognition, Institute of Electrical and Electronics Engineers, pp. 413-420, 2009.
Alec Radford, et al. "Learning transferable visual models from natural language supervision," Proceedings of the 38th International Conference on Machine Learning, PMLR 139:8748-8763, 2021.
Kuniaki Saito, et al. "Open set domain adaptation by backpropagation," Proceedings of the European Conference on Computer Vision (ECCV), 2018, pp. 153-168.
Burr Settles. "Active learning literature survey". Computer Sciences Technical Report 1648, University of Wisconsin-Madison, pp. 1-46, 2009.
Kihyuk Sohn, et al. "Fixmatch: Simplifying semisupervised learning with consistency and confidence," Part of Advances In Neural Information Processing Systems 33 (NeurIPS 2020), pp. 1-13.
Andreas Steiner, et al. "How to train your vit? data, augmentation, and regularization in vision transformers", Published in Transactions on Machine Learning Research (May 2022), arXiv:2106.10270v22021, pp. 1-16.
Yu Sun, et al. "Test-time training with selfsupervision for generalization under distribution shifts," Proceedings of the 37th International Conference on Machine Learning, PMLR 119:9229-9248, 2020.
Yonglong Tian, Olivier J. Henaff, and Aaron van den Oord. "Divide and contrast: Self-supervised learning from uncurated data," Proceedings of the IEEE/CVF International Conference on Computer Vision (ICCV), 2021, pp. 10063-10074.
Yi-Hsuan Tsai, et al., "Learning to adapt structured output space for semantic segmentation," Proceedings of the IEEE Conference on Computer Vision and Pattern Recognition (CVPR), 2018, pp. 7472-7481.
Dequan Wang, et al., "Tent: Fully test-time adaptation by entropy minimization," Published as a conference paper at CLR 2021, arXiv:2006.10726v3, pp. 1-15.
Wang, et al. "Logo-2k+: a large-scale logo dataset for scalable logo classification." The Thirty-Fourth AAAI Conference on Artificial Intelligence (AAAI-20), pp. 6194-6201, 2020.
Peng Wang, et al. "OFA: Unifying architectures, tasks, and modalities through a simple sequence-to-sequence earning framework," Proceedings of the 39th International Conference on Machine Learning, PMLR 162:23318-23340, 2022.
Zifeng Wang, et al., "Learning to prompt for continual learning," Proceedings of the IEEE/CVF Conference on Computer Vision and Pattern Recognition (CVPR), 2022, pp. 139-149.
Xi Yan, David Acuna, and Sanja Fidler. "Neural data server: a large-scale search engine for transfer learning data," Proceedings of the IEEE/CVF Conference on Computer Vision and Pattern Recognition (CVPR), 2020, pp. 3893-3902.
Jingkang Yang, Kaiyang Zhou, Yixuan Li, and Ziwei Liu. "Generalized out-of-distribution detection: a survey," Submitted to IEEE Transactions on Pattern Analysis and Machine Intelligence, arXiv:2110.11334v2, pp. 1-22, 2021.
Dani Yogatama, Cyprien de Masson d'Autume, and Lingpeng Kong. "Adaptive semiparametric language models," Transactions of the Association for Computational Linguistics (2021) 9: pp. 362-373, 2021.
Hongyi Zhang, et al. "mixup: Beyond empirical risk minimization," Published as a conference paper at ICLR 2018, arXiv:1710.09412v2, pp. 1-13.
Marvin Zhang, Sergey Levine, and Chelsea Finn. "Memo: Test time robustness via adaptation and augmentation," Part of Advances in Neural Information Processing Systems 35 (NeurIPS 2022) Main Conference Track, pp. 1-14.

* cited by examiner

ADAPTING PRE-TRAINED MACHINE LEARNING MODELS USING TARGET DATA SETS

BACKGROUND

Machine-learning models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

Figure 1:
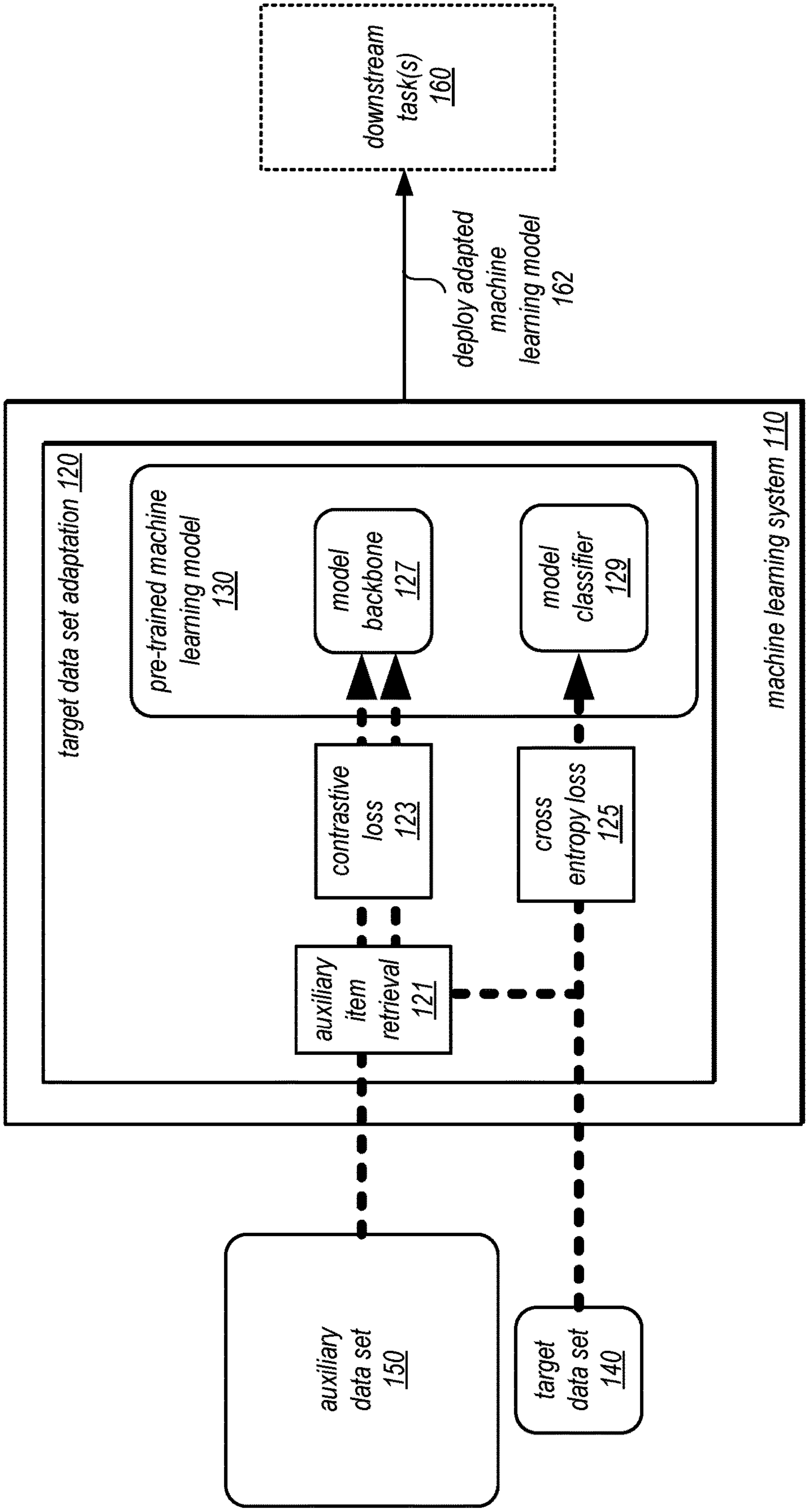
FIG. 1 illustrates a logical block diagram of adapting pre-trained machine learning models using target data sets, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of adapting pre-trained machine learning models using target data sets are described herein. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

Some machine learning pre-trained machine learning models may be considered "foundational" machine learning models, which may be trained on broad data sets and usable across a category of problems. These pre-trained machine learning models can be used by various model users to perform different tasks as part of different applications. However, in order to improve pre-trained machine learning model performance to perform particular tasks for particular model users, further training of the pre-trained machine learning model (which may be referred to as adapting, tuning or fine-tuning) may be performed.

For example, while deep learning models are evolving rapidly, machine learning systems used in production are updated rarely, as each deployment requires the provider to engage in a complex process of scaling, securitization, certification of new model and dataset cards, bias evaluation, and regression tests. It is now common for developers to adapt trained models to their specific use cases, or to the changed context as time goes by. Such adaptation can be performed by fine-tuning on a specific dataset S owned by the developer. However, on an even finer time-scale, developers may want to adapt their models based on data they observe at test time, bypassing the time-consuming annotation process. Test-time Adaptation (TTA) refers to the problem of adapting a source model to a target task T represented by test data, for which no ground-truth labels are given.

This trend is exacerbated by the advent of foundation models, such as in the visual domain where tasks can be antagonistic and models are sensitive to even subtle changes in the data distribution. At the same time, both developers and providers typically have access to ever growing pools of auxiliary data, albeit often heterogeneous (pertaining to concepts other than the one of interest at test time), and without annotations. Yet it seems plausible that somewhere within these large pools of data, there may be information useful for the task at hand.

The technical challenge of performing test time adaptation may be overcome by techniques for adapting pre-trained machine learning models using target data sets, as discussed below, by retrieving information from a large, unlabeled, heterogeneous, and evolving auxiliary dataset. The same procedure could also be followed by the provider, if they have access to auxiliary internal data and wish to adapt the production model based on trends observed in test data at training time as well.

Techniques for adapting pre-trained machine learning models using target data sets at test time or train time would enable a number of real-world tasks, overcoming technical challenges that have thus far frustrated developers and. For instance, various embodiments of adapting pre-trained machine learning models using target data sets at test time or train time may allow a developer to select, among a vast data lake A, which samples to use for a training, based on labeled and unlabeled samples. It would also enable nimble inference, by adapting a modest-size model to specific tasks, rather than relying on an unwieldy model to master all trades. Finally, it would enable reversible adaptation. Therefore, a model adapted to one task may behave poorly on another, and a model that encompasses both would require significantly higher capacity, to the detriment of inference efficiency. In various embodiments, changing T changes the subset of A that is retrieved, with no impact on other models, instantiating smaller independent models for antagonistic tasks, rather than coercing them into a larger one, likely multiplying inference costs.

In various embodiments, techniques for adapting pre-trained machine learning models using target data sets at test time or train time can be used in a continual setting, where at each time t one has a different target $T_t$, and the auxiliary task A is composed of the union of all prior targets $T_0$, . . . , $T_t$. The retrieval system can automatically determine what information from whatever past targets is relevant to the present, and what information is redundant in A and can be eliminated. A difference compared to ordinary continual learning is that each step starts with the base model, so there is no catastrophic forgetting, and what is updated is the auxiliary task. Accordingly, the integration of information occurs in A, not in the trained model f.

Unlike techniques that can still access training data set S or where the training data set T has labels or that assume that training set S and target data set T have the same joint distribution in order to predict labels for items from auxiliary data set A, techniques for adapting pre-trained machine learning models using target data sets at test time or train time can be performed without access training data set S, where the training data set T has labels, and/or that assume that training set S and target data set T have the same joint distribution in order to predict labels for items.

In various embodiments, techniques for adapting pre-trained machine learning models using target data sets at test time or train time may be based on unlabeled dataset T, that selects samples from an auxiliary dataset A, using a retrieval model R. Starting from any model $f_S$ pre-trained by the provider on a dataset D and later fine-tuned by the user on a labelled data set S, these techniques may finds subsets of an auxiliary dataset A that are relevant for T, using a retrieval technique based on similarity of target data item(s) from T (e.g., using nearest neighbors) in A to samples in T, measured in a representation space computed by a retrieval mode R (e.g., for images using a techniques such as a CLIP embedding).

In various embodiments, techniques for adapting pre-trained machine learning models using target data sets at test time or train time may use contrastive loss used for updating the model $f_S$ to a new model $f_{A|T}$, whereby negative pairs are selected by retrieving samples from A that are informative of T using the retriever R and by excluding same-class negatives pairs from T exploiting assigned pseudo labels obtained by averaging their logits on different data augmentations. For instance, in some embodiments, techniques for adapting pre-trained machine learning models using target data sets at test time or train time can provide a form of contrastive "dataset augmentation" by enlarging the user data with samples drawn from a different (unlabeled) dataset A, based on guidance provided by a retriever R. Such techniques can be followed by both the developer (or other user that is adapting a pre-trained machine learning model) and the provider (of the pre-trained machine learning model), thus empowering them to adapt the model (train-time adaptation) or a sequence or disjoint collection of custom models (test-time adaptation). Such techniques can improve downstream task performance (e.g., classification accuracy) over existing supervised fine-tuning for train-time techniques and test-time adaptation techniques.

FIG. 1 illustrates a logical block diagram of adapting pre-trained machine learning models using target data sets, according to some embodiments. Machine learning system 110 may be a stand-alone system or implemented as a machine learning service of a provider network, as discussed below with regard to FIG. 2. Machine learning system 110 may implement various features for training, developing, and deploying a machine learning model. In some embodiments, machine learning system 110 may implement target data set adaption 120 for adapting a pre-trained machine learning model, such as pre-trained machine learning model 130, at training time and/or test time as discussed in detail below. For example, given a pre-trained machine learning model 130 (e.g., a classification model for images, text, audio, video, or various other input data types), which may have been previously trained according to a training data set S, machine learning system 110 may implement target data set adaptation 120.

Target data set adaptation 120 may receive target data set 140, which may be selected, specified, or otherwise provided by an engineer, developer, or other user of machine learning system 110 that is adapting pre-trained machine learning model 130 for one or more downstream task(s) 160. Because target data set 140 may not be large for adaptation purposes (e.g., due to data collection or annotation costs, or target data set being test-time data) target data set adaptation 120 may make use of auxiliary data set 150 in order to identify and use additional examples retrieved from auxiliary data set 150. For example, as discussed in detail below with regard to FIGS. 3, 5, and 6, auxiliary data set 150 may be indexed and searched using auxiliary item retrieval 121 in order to identify a number of auxiliary data set items according to their similarity to an item of target data set 140. Thus, both the retrieved items from auxiliary data set 150 and item from target data set 140 may be used to adapt different portions of pre-trained machine learning model 130, using contrastive loss 123 to update the backbone portion of the model 127 and cross entropy loss 125 to update (using the target data set item(s) alone) the classifier portion of the model 129.

The adaptation techniques may be iteratively performed for each of the items in target data set 140, in some embodiments. Then, as indicated at 162, the adapted machine learning model may be deployed for downstream task(s) 160 (e.g., such as being deployed on host systems for performing inferences as discussed below with regard to FIG. 4).

Please note that the previous description of is a logical illustration of a machine learning system and thus is not to be construed as limiting as to other embodiments of a machine learning system.

This specification continues with a general description of a provider network that implements multiple different services, including a machine learning service, which may implement adapting pre-trained machine learning models using target data sets. Then various examples of, including different components/modules, or arrangements of components/module that may implement adapting pre-trained machine learning models using target data sets are discussed. A number of different methods and techniques to implement adapting pre-trained machine learning models using target data sets are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
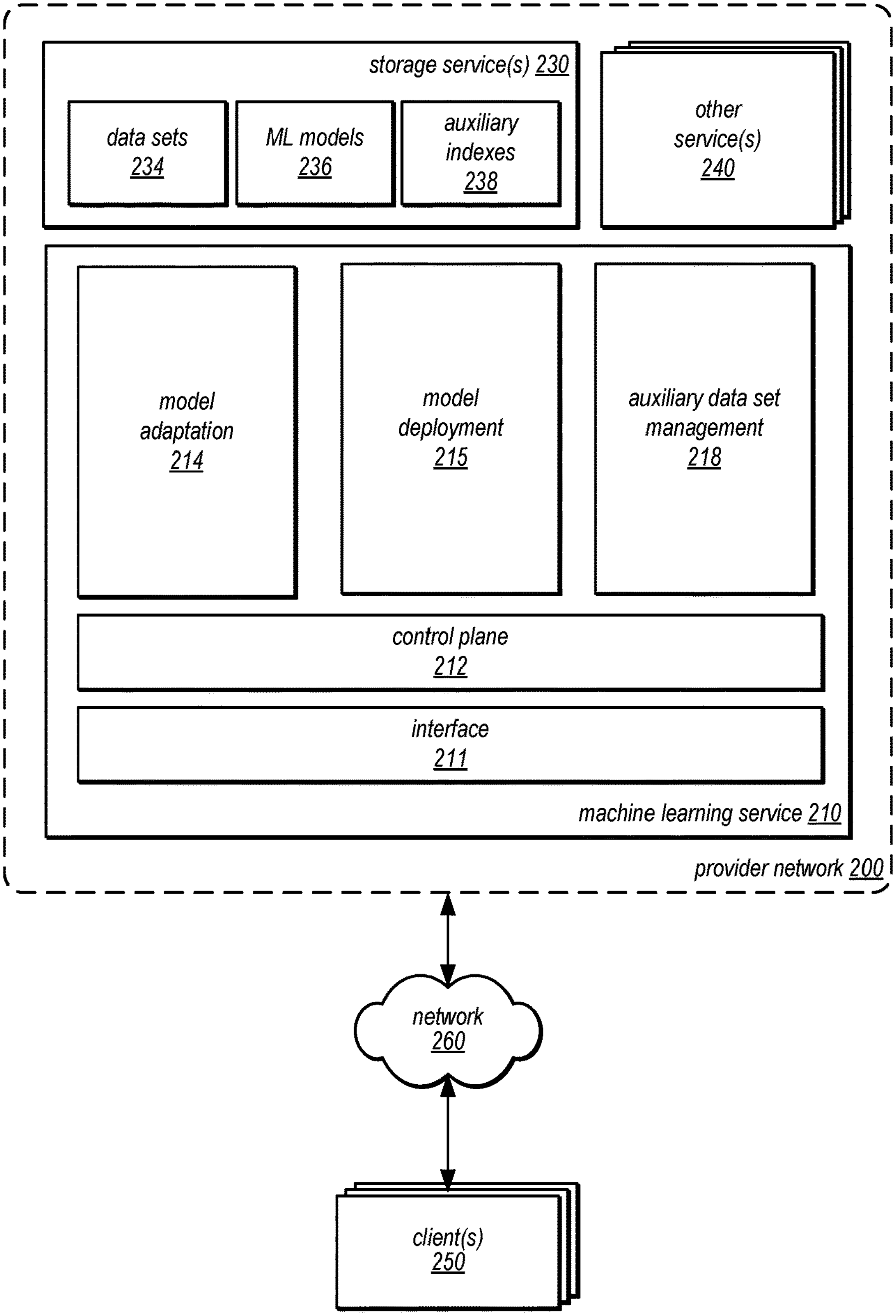
FIG. 2 illustrates an example provider network that may implement a machine learning service that implements adapting pre-trained machine learning models using target data sets, according to some embodiments.

FIG. 2 illustrates an example provider network that may implement a machine learning service that implements adapting pre-trained machine learning models using target data sets, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks or various other types of machine learning models). For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, labeling or other management requests. For example, interface 211 may include development and deployment environment, which may provide a training script or other code editor with various development tools to create, submit, and/or monitor machine learning pipeline with a training job and/or monitoring job. Development and management environment may be a graphical interface, in some embodiments, and may provide an interface to past results generated for other models, in some embodiments. Interface 211 may also allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as training as part of model development, including model adaptation 214, execution of machine learning models as part of model deployment 215 or auxiliary data set management techniques as part of auxiliary data set management 218. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Figure 3:
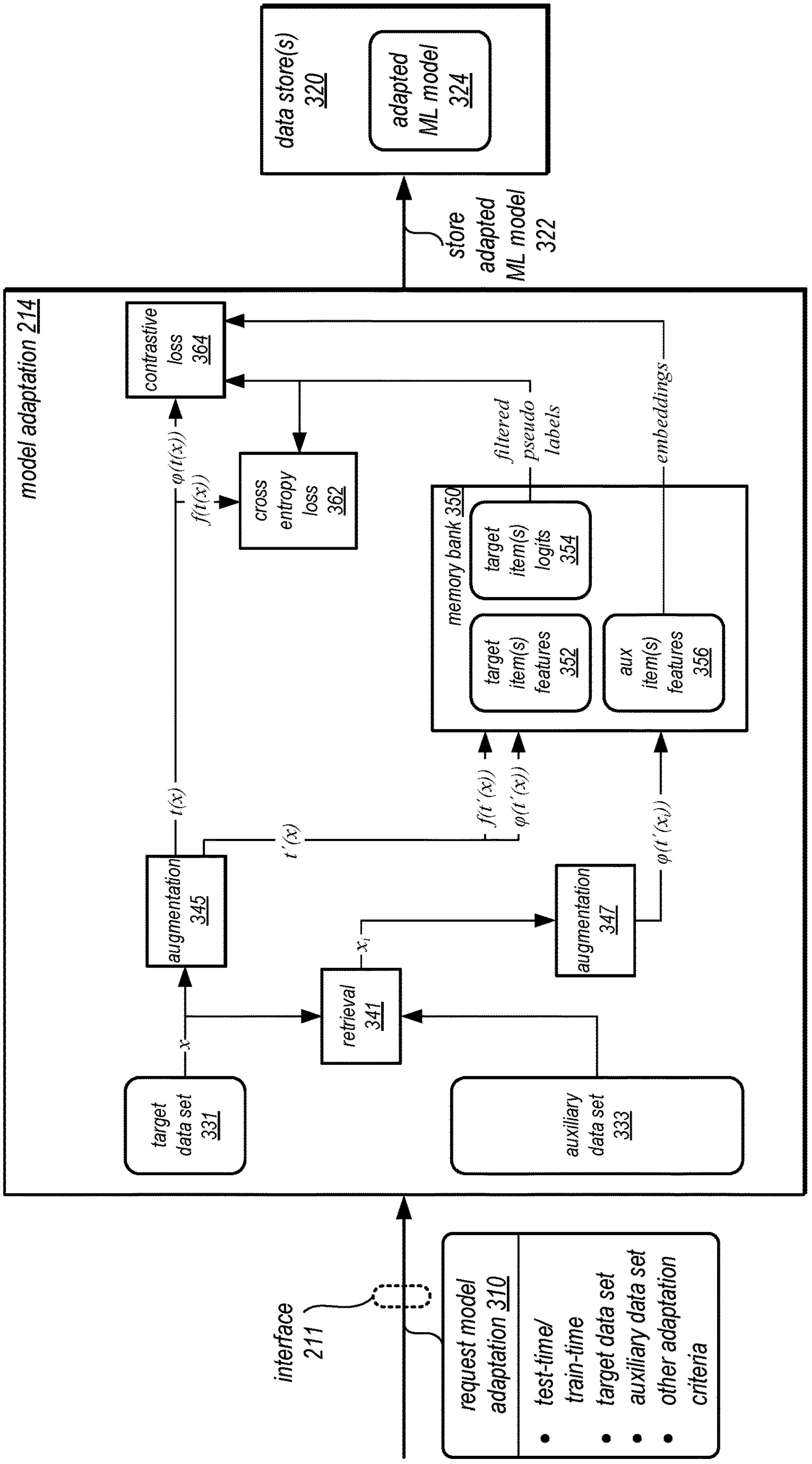
FIG. 3 illustrates a logical block diagram illustrating model adaptation at test time for adapting a pre-trained machine learning model, according to some embodiments.
Figure 5:
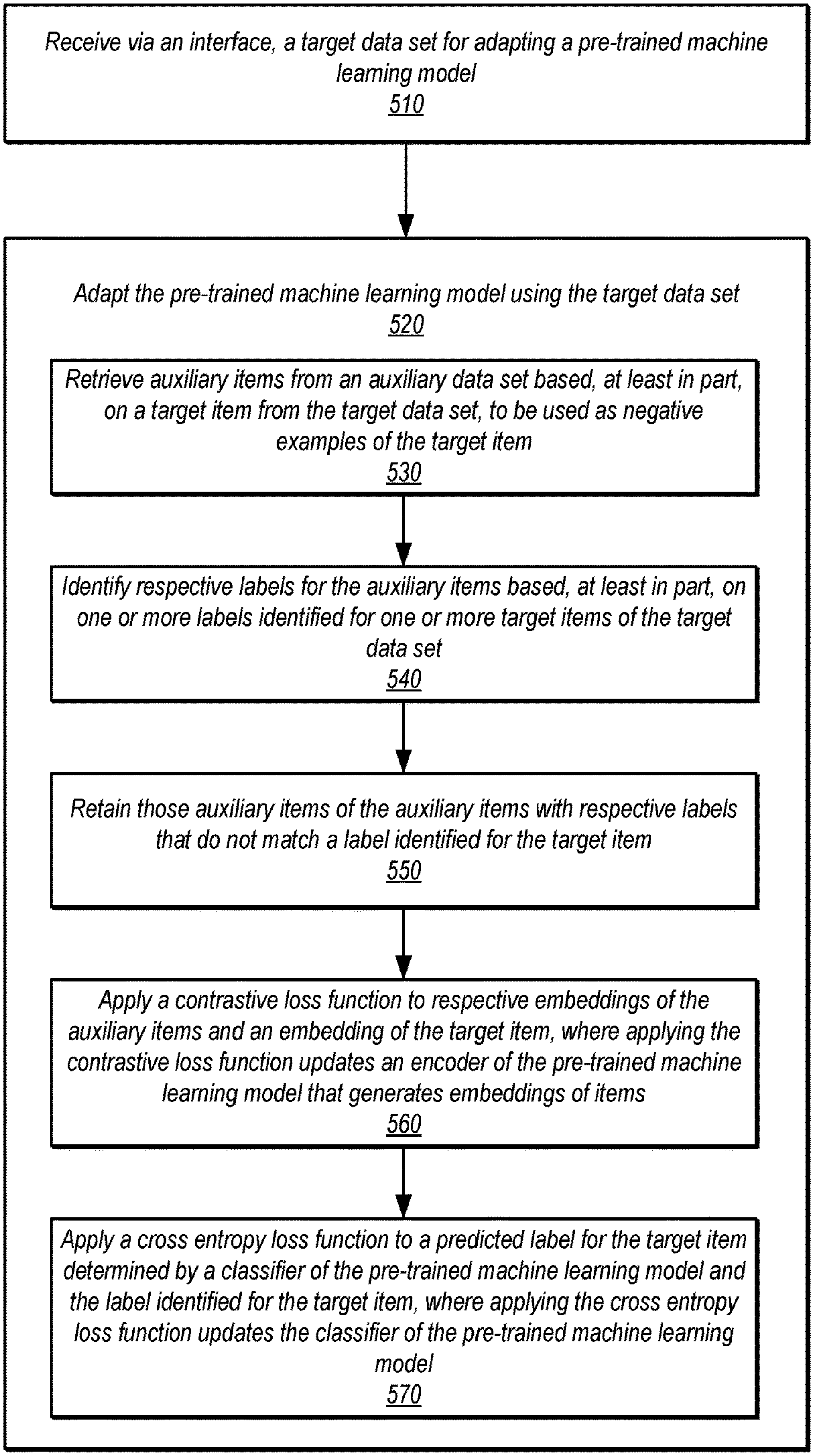
FIG. 5 is a high-level flowchart illustrating various methods and techniques for adapting pre-trained machine learning models using target data sets, according to some embodiments.

Machine learning service 210 may implement model adaptation 214 to develop, configure, program, define, and/or otherwise execute adaptation jobs on various machine learning models using data sets, such as data sets 234 in storage services 230 across one or more training nodes (which may include one or more respective processing devices for training, such as GPUs) according to various techniques discussed in detail above with regard to FIGS. 3 and 5. In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment of interface 211, and executed. Various tests or other development operations for machine learning models may also be performed. In some embodiments, the various files, configuration information, and other data for machine learning model development may be organized as a project (or other collection) and stored, versioned, or otherwise managed by model adaptation 214 (e.g., as a collection of one or more files or data objects in storage services 230, including data sets 234, ML models 236, and auxiliary indexes 238). Adaptation jobs may be submitted to training nodes implemented as part of model adaptation 214 (e.g., via development environment or other interfaces) to adapt machine learning models on identified target data set(s) (which may be stored as part of data set(s) 234 in storage service(s) 230 uploaded.

In various embodiments, machine learning service 210 may implement model deployment 215, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences.

Auxiliary data set management 218 may allow for the ingestion, creation, access, or otherwise providing different auxiliary data sets for use as part of model adaption 214 techniques. For example, as discussed in detail below with regard to FIG. 6, auxiliary data set management 218 may index a new auxiliary data set in order to use it for train time or test time adaptation. Different retrieval techniques (e.g., different types of similarity searches or analyses) may be used. Corresponding types of auxiliary indexes 238 may be used.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to create or perform an explanation job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to upload machine learning models to machine learning service 210 or to fine-tune hosted machine learning models) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, machine learning service 210 may act as a pre-trained machine learning model hub or catalog, providing users with a wide variety of pre-trained machine learning models offered via machine learning service 210, including models developed and maintained by machine learning service 210 (or other provider network 200 service) and pre-trained machine learning models offered by many different model providers (e.g., submitted through interface 211). This may allow machine learning service 210 to provide access to a wide variety of pre-trained machine learning models across many different categories of tasks, knowledge domains, and use cases, offering state-of-the-art artificial intelligence capabilities which can then be customized via fine-tuning and deployed for use in various applications.

Although FIG. 2 depicts machine learning service 210 as a general machine learning service, in some embodiments, machine learning service 210 may be implemented for specific machine learning tasks using, for example, a foundational model or other service-provided model to perform tasks. For example, machine learning service 210 may perform computer vision tasks, such as object recognition in image data, and thus may be a recognition service for which the foundational model can be adapted according to the techniques discussed above with regard to FIG. 1 and below with regard to FIGS. 3-6. Various other machine learning tasks may be implemented in other embodiments for which machine learning service 210 is specialized to perform (e.g., a speech recognition service and transcription service, etc.).

FIG. 3 illustrates a logical block diagram illustrating model adaptation at test time for adapting a pre-trained machine learning model, according to some embodiments. As indicated at 310, a request for model adaptation may be received. The request may specify various features that machine learning service 210 may perform as part of model adaptation. For example, an indication as to the type of adaption may be performed, whether test-time adaptation or train-time adaptation. For training time adaptation, a different workflow may be used, as discussed below. Another indicated criteria may be the target data set, which may include the location, identifier, or other information to access the target data set (or the target data set itself). In some embodiments, the request may select the auxiliary data set to use, in some embodiments. Other adaptation criteria may also be included, such as time, resource, cost or other adaptation limitations that may be provided, the selection of different techniques for retrieving items form the auxiliary data set, or other features of model adaptation 214.

The example data flow of model adaptation 214 is discussed below. A target item (or multiple target items) may be obtained from target data set 331. The item may be used to retrieve, as indicated at 341, a number of items from auxiliary data set 333. These retrieved auxiliary items may be augmented, as indicated at 347, and then stored in memory bank 350 as auxiliary item features 356. Pseudo labels may be identified for auxiliary items based on target item logits 354 and target item features 352 and then filtered so that auxiliary items with labels that match a label determined for the augmented form of the target item, provided from augmentation 345, are not included for contrastive loss 364. The filtered pseudo label(s) may also be used to supervise cross entropy loss 362 for an augmented form of target data set item. After a number of iterations, the adapted ML model 324, may be stored, as indicated at 322 in data store 320.

In various embodiments, a provider may pre-train model g on a dataset D, which may be indicated with $g_D$: X→Z where X are RGB images and $Z=\mathbb{R}^d$ where d is the dimension of the feature space. Here, D is a large dataset which is typically not accessible after training and may, with time, become obsolete.

A user has access to go, but wishes to improve it on a specific dataset S to build a custom classifier $f_S$: X→Y, using $g_D$ as a backbone, and fine-tuning it along with a linear layer.

Test data x∈T, owned by the user and optionally made available to the provider, is drawn from an unlabeled dataset T, which may be different from both S and D, but shares the same hypothesis space Y of S. In particular, there may be a domain shift from S to T, or the two may pertain to entities, such as products or fashion, that evolve over time. If such out-of-distribution phenomenon is manifest in the test samples, not only $g_D$, but even $f_S$ will perform poorly.

In various embodiments, techniques for adapting a pre-trained machine learning model may leverage an auxiliary dataset A, starting from $f_S$, but without directly accessing S, and leveraging instead unlabeled data from T available at test time (e.g., inference time). The resulting adapted model may be called $f_{A|T}$, where the dependency on S is implicit in its pre-training. In some scenarios, A may be a private dataset, accessible to the user but not the provider. Conversely, the provider may have its own internal dataset W that may be available to adapt the model to commonly observed tasks from opted-in users, using the same process followed by the user to perform test-time adaptation.

In various embodiments, techniques for adapting a pre-trained machine learning model may train a model $f_{A|T}$ that improves the baseline $f_S$ and reaches as close as possible to the paragon which is to train with the entirety of the datasets D, S, A and T. To this end, any generic pretraining $g_D$ and fine-tuning $f_S$, may be considered and perform retrieval by finding subsets of A that are informative of T. In some embodiments, this may be done by finding nearest neighbors of samples of T in A in CLIP embedding space computed by a retrieval model R. Aggregation may then be performed to combine T with A into an "augmented training set". Given each datum in x ET, multiple augmentations xi may be created and $f_S$ may be used to compute the corresponding pseudo-labels. Then, consider a contrastive loss (discussed below) whose objective is to pull closer features of different views (positive pairs) while pushing away features of different images (negative pairs). The retrieved samples may be considered as negatives from A that are neighbors to T with R and samples in T with negative pseudo-labels.

These techniques may indirectly find samples in A that are synergistic with T as contrastive neighbors and avoid pushing away same-class pairs to learn better semantically meaningful clusters. Redundant information may be avoided by removing samples with near-duplicate embeddings according to R. The contrastive loss may not update the linear classifier but only the features in the backbone portion of the model (which may be portions of the pre-trained machine learning model up to but not inclusive of the final layer(s) that produce the classification result in a neural network). So, $f_{A|T}$ is updated with supervision from the pseudo-labels generated in T, as discussed below.

In various embodiments, retrieval 341 of auxiliary data set 333 items may be implemented as discussed below. Since the search cost scales with the data pool size, different types of retrieval techniques may be used. In some scenarios, a fast general purpose retrieval system that filters irrelevant data given the target samples (e.g. out of distribution or near duplicate) may be implemented. In some embodiments, retrieval 341 may be implemented using an encoder (e.g., a general image encoder), R: X→$\mathbb{R}^d$, , that is used to index the auxiliary data set 341 (e.g., a pool of images A). Different retrieval systems may lead to largely different retrieval distributions that can depend on the invariance classes imposed during the retrieval pre-training objective. For example, while a CLIP model is trained to be invariant to the semantic (e.g., trained to match images with likely captions), a self-supervised model (e.g. DINO) is trained to be invariant to per-sample synthetic data augmentations. While in some embodiments, specialized fast approximate nearest-neighbor search (such as Facebook AI Similarity Search (FAISS) or Scalable Nearest Neighbors (SCaNN)) are not used, and instead a brute force search on the most similar keys on auxiliary data set indexes (e.g., embedding indexes) can be used (e.g., because the size of the external database may not provide sufficient performance gains to use approximate nearest neighbor search). In other embodiments, approximation search techniques (such as FAISS or SCaNN) can be used (which may or may not utilize auxiliary data set indexes).

In various embodiments, the learning objective for performing model adaptation 214 may include two parts. First, a self-supervised objective function that is used to incorporate retrieved information from A both at train and test time, contrastive loss 364. Second, a cross entropy 362 objective that is driven by ground truth labels at training time and by filtered pseudo-labels (as illustrated) at test time.

The self-supervised objective function, contrastive loss 364, may be used to incorporate information from A (e.g., auxiliary data set 333). A contrastive objective driven by pairwise information may be used. For example, instance discrimination principle may be used where features of different views of the same item (e.g., image), positive pairs, are pulled closer, while features of different items (negative pairs) are pushed away. Even in presence of domain shift, the contrastive loss discriminative power increases with more negative samples. However, adding easily separable negative samples does not provide much learning signal. Retrieval 341 R can be used to modify the noise distribution and gather images that serve as harder negatives.

Given an image x, in some embodiments, a weakly augmented view t(x) and a strongly augmented view t'(x) may be generated, as indicated at 345. Then, the InfoNCE loss between q=ϕ(t(x)), k=ϕ(t'(x)) and the set of strongly augmented negative examples $N_q$. Here, ϕ denotes the last layer features (before the classifier head) extracted by the model $f_{A|T}$ being trained and the set $Nq \subset A \cup T$ is composed by different-class samples from T and by retrieving samples from A that are nearest neighbors to x according to R. Thus, contrastive loss 364 may be described, in some embodiments as:

$$\mathcal{L}_{ctr}(x) = -\log\frac{\exp(q\cdot k/\tau)}{\sum_{j\in N_q}\exp(q\cdot k_j/\tau)}$$

where τ is a temperature hyper-parameter and $k_j$ are feature embeddings stored in a memory bank of length $n_p$ that is updated by appending k at each step. Note that the choice of the negative set $N_q$ specifies different adaptation strategies.

The contrastive loss 364 above might strive to minimize the cosine distance between q and k while maximizing the cosine distance of q and all the negatives in the denominator. In particular, not pushing away same-class pairs may help in building a feature space that is more aligned with the semantic of the downstream task. Therefore, when the label information (or pseudo labels) is available, $N_q$ may be modified not to include samples with the same label y (or pseudo label $\bar{y}$) of x, which may be described as:

$$N_q^{lab} := \{j \mid y \neq y^j\} \cup \emptyset$$

Furthermore, the auxiliary data set 333 (A) may be used to further increase the negatives. In some scenarios, naively leveraging a large pool of un-curated data in a self-supervised contrastive loss might not lead to performance improvements since some negatives can be less informative (e.g., easy negatives). Accordingly, in some embodiments, the retrieval system 341 (R) can be implemented to gather more relevant negatives. For example, R may build $$N_q^{ret} := NN_{n_r}(q)$$

as the set of $n_r$ nearest neighbors of x from A. Because only retrieving from the nearest neighbors might be counterproductive in some scenarios, since many nearly duplicate items (e.g., images) could be retrieved and considered as negative and even more counterproductive if there is a small/no distribution shift between adaptation data and the external pool of samples. Accordingly, in some embodiments retrieval 341 may further include randomly extracting $n_r$ samples among $NN_{r\times n_r}(q)$. The number of samples may be a default value or specified as part of other adaptation criteria in request 310. For example, r=5 could be a default value. The set of negative examples may be $$N_q = N_\alpha^{lab} \cup N_q^{ret}.$$

It is possible to adapt pre-trained models not only at test time (by the user) but also at train time (e.g., perform adaptation by the machine learning service 210 to update the core model) as new data become available. In the latter case, ground truth labels might be available and may not be discarded. The techniques discussed above can work with ground truth labels by incorporating them into its main objective in place of pseudo labels so that ground truth labels are used to avoid same-class negatives and are used to directly supervise the model predictions. For test-time scenarios when ground truth labels are not available, these techniques can exploit the close-set assumption, and directly use labels. However, their quality is important, therefore a simple refinement strategy may be implemented in some embodiments to get "filtered" pseudo labels.

For example, since the contrastive loss 364 does not directly update the last layers or other classifier portion of the model (e.g., the linear classifier) but only the backbone (e.g., features) of the predictive model, supervision may be incorporated into the objective function by exploiting labels y (if available) or, more generally, pseudo labels $\bar{y}$, that are generated by the hypothesis $f_{A|T}$. However, pseudo labels can be noisy, especially if T is different from S, therefore pseudo labels may be further refined by leveraging other augmented views of the same image x, as depicted in FIG. 3 where the augmented view of the image is output to memory bank 350, as described by:

$$\bar{y}(x) = \arg\max_i \bar{f}_{A|T}(x)$$

where $\bar{f}_{A|T}$ (x) may be obtained by averaging logits (e.g., un-normalized final scores or un-normalized probabilities of different classification labels being the classification for a given target item x, such a label A=0.7, label B=0.5, and label C=0.4 (the total of label values exceeding 1 indicating that they are not normalized) with respect to strong synthetic data augmentations of t'(x). To further improve efficiency and reduce training time, a memory bank 350 may be implemented which contains past predicted logits and features.

Using "filtered" pseudo labels to guide model adaptation can be interpreted as a form of consistency regularization or distillation, which, in the case of semi-supervised learning has the main objective of propagating the known labels towards the unlabeled samples. In some embodiments, this semi-supervised learning may be implemented as a cross entropy loss 362, described as:

$$L_{ce}(x)=EE_{x\in D_t}H(\bar{y}(x), f_{A|T}(t(x)))$$

where $$H(a, b) = -\sum_{c=1}^{C} a_c \log b_c \text{ and } \hat{y}_t$$

is the "filtered" pseudo label, where

Figure 4:
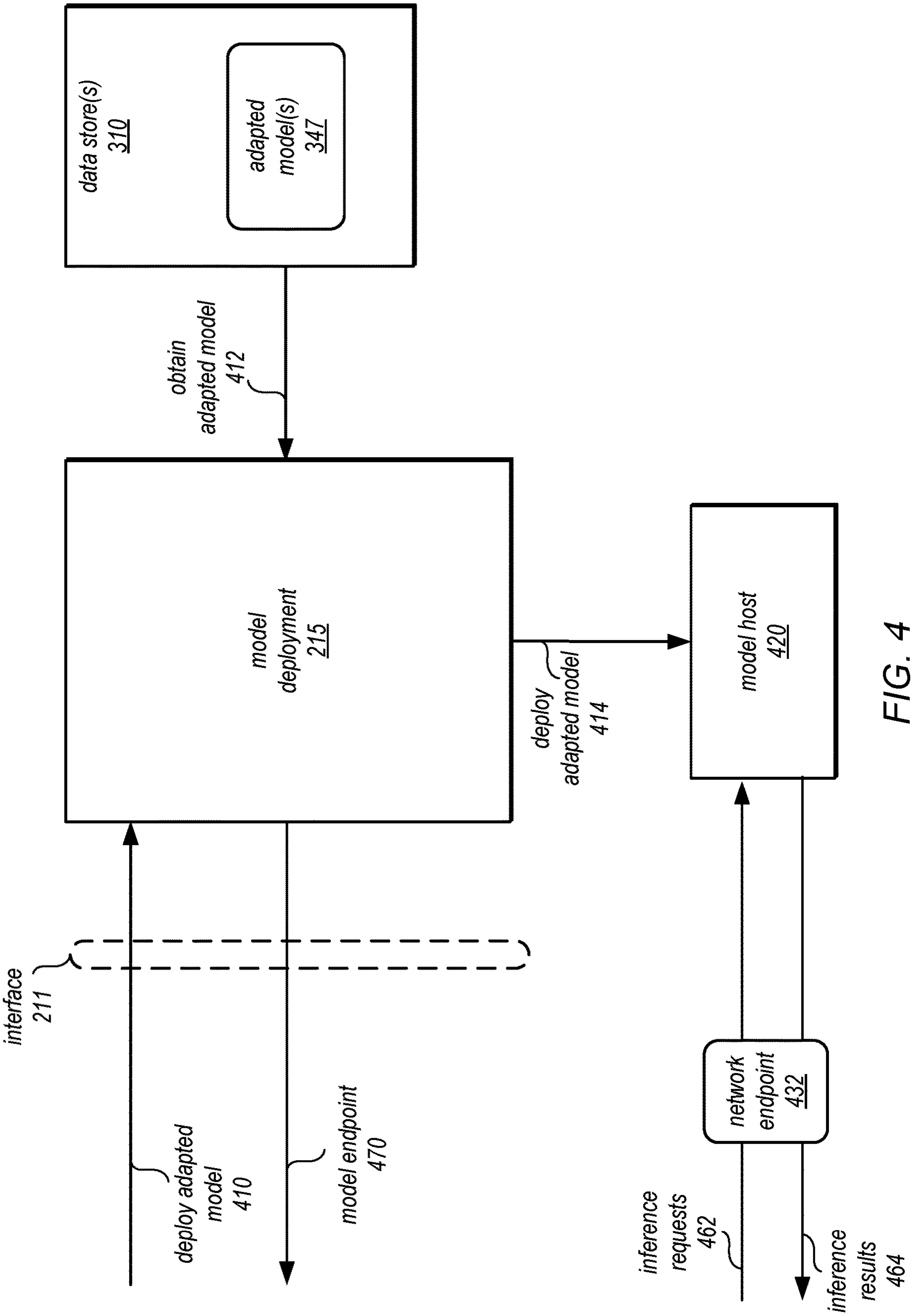
FIG. 4 illustrates a logical block diagram illustrating deploying an adapted machine learning model, according to some embodiments.

FIG. 4 illustrates a logical block diagram illustrating deploying a confidentially tuned machine learning model for confidential deployment, according to some embodiments. Model deployment 215 may receive a request to deploy an adapted model 410 via interface 211. For example, a model identifier may be included and verified with respect to an access control list to determine that the model user account associated with the deploy request 410 may also be associated with the adapted model 347. In this way, adapted model(s) 347 may be limited to use by a model user account on whose behalf the model was tuned (and not another model user account).

Model deployment 215 may obtain 412 adapted model 347 from data store 310 and deploy it onto model host 420. Model host 420 may be implemented so as to restrict access to model host 420 to permitted components, such as network endpoint 432. In this way, model host 422 may be in a service accessible network, account, or portion of machine learning service 210 (or provider network 200), while network endpoint 432 may be in a model user account accessible network, account, or portion of machine learning service 210 (or provider network 200), in some embodiments. Alternatively, network endpoint 432 and model host 420 may be both in user accessible networks or service accessible or provided networks of machine learning service 210 (or provider network 200).

Although FIGS. 2-4 have been described and illustrated in the context of a provider network implementing a machine learning service, the various components illustrated and described in FIGS. 2-4 may be easily applied to other machine learning systems that may make use of adapting pre-trained machine learning models. As such, FIGS. 2-4 are not intended to be limiting as to other embodiments. Additionally, the various techniques discussed below with regard to FIGS. 5 and 6 may be implemented using various features or components of the machine learning service described above.

FIG. 5 is a high-level flowchart illustrating various methods and techniques for adapting pre-trained machine learning models using target data sets, according to some embodiments. As indicated at 510, a target data set for adapting a pre-trained machine learning model may be received via an interface (e.g., of a machine learning system similar to machine learning system 110 in FIG. 1), in some embodiments. For example, the target data set may be specified and obtained according to an adaptation request (e.g., request 310 in FIG. 3). In some embodiments, the target data set may be received or specified as part of an adaptation workflow or pipeline specified or described in a machine learning system (e.g., via a development environment). As discussed above, the target data set may be used for test-time adaptation, and therefore may not have ground truth labels. In other scenarios, the target data set may have ground truth labels (e.g., when performing train-time adaptation).

As indicated at 520, the pre-trained machine learning model may be adapted using the target data set, in some embodiments. An auxiliary data set may be identified for adaptation, in some embodiments. For example, the auxiliary data set may be a default auxiliary data set, or may be one of many different offered auxiliary data sets, one or more of which may be selectable for use in adapting the pre-trained machine learning model. As discussed below, auxiliary data sets may be multi-modal, combining or using multiple different retrieval techniques for different types or modes of data.

As indicated at 530, auxiliary items may be retrieved from an auxiliary data set based, at least in part, on a target item from the target data set, to be used as negative examples of the target item, in some embodiments. For example, one (or more) target items may be obtained from the target data set and used to perform similarity analyses with respect to items in the auxiliary data set. In some embodiments, fast search or other similarity approximation techniques, such as FAISS or SCaNN, can be used to search the auxiliary data set. In some embodiments, as discussed below, an auxiliary data set index may have been generated and used to compare similarity of auxiliary data set items with target item(s) using, for example, the various retrieval techniques R discussed above with regard to FIG. 3. Retrieval may be performed in multi-modal fashion, as discussed below.

As indicated at 540, respective labels for the auxiliary items may be identified based, at least in part, on one or more labels identified for one or more target items of the target data set, in some embodiments. For example, in a test-time scenario when no ground truth labels are available, pseudo labels may be generated using previously predicted labels for target item(s), such as the target item, as well as past target items. These previously predicted labels may be maintained as logits of the different label predictions for each target item (e.g., maintaining the un-normalized probabilities of different labels being the label for a target item). For example, logits may be averaged on different data augmentations of target item(s) (as depicted in FIG. 3 using augmentation from 345) in order to identify as the pseudo label the highest scoring label (e.g., by averaging the augmented target item's logits with the past logits for other augmented target data items). A similar technique can be implemented for auxiliary data set items. In scenarios where target data set has ground truth labels, then the corresponding ground truth label of the target item may be identified for the target item. The ground truth labels may also be used to identify the auxiliary data items (e.g., out of the set of ground truth labels).

As indicated at 550, those auxiliary items of the auxiliary items with respective labels that do not match a label identified for the target item may be retrained, in some embodiments. In this way, only negative examples from the auxiliary items may be used for contrastive loss, in some embodiments.

As indicated at 560, a contrastive loss function may be applied to respective embeddings of the auxiliary items and an embedding of the target item, where applying the contrastive loss function updates a backbone of the pre-trained machine learning model, in some embodiments. As discussed above with regard to 364 in FIG. 3, the contrastive loss may be a loss function that utilizes the contrast between pairs of items (e.g., a target item and an auxiliary data set item) to better classify items similar to those of the target data set (e.g., as the negative examples can be used to adjust weights of the model to recognize and push away in feature space dissimilar items as indicated by the negative examples provided from the auxiliary data set).

As indicated at 570, a cross entropy loss function may be applied to a predicted label for the target item determined by a classifier of the pre-trained machine learning model and the label identified for the target item, where applying the cross entropy loss function updates the classifier of the pre-trained machine learning model, in some embodiments. As discussed above with regard to 362 in FIG. 3, the cross entropy loss may be semi-supervised using the filtered pseudo labels or actual labels when ground truth labels are available for the target data set.

The techniques depicted in FIG. 5 may be repeated for a number of times (e.g., iteratively until each item in the target data set has been obtained and used).

Figure 6:
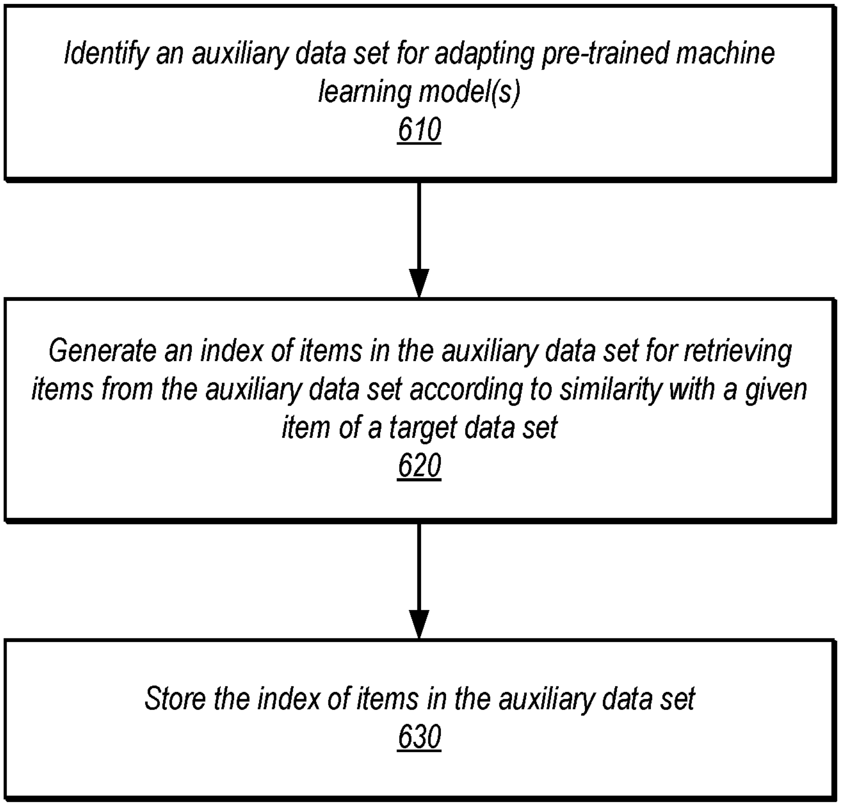
FIG. 6 is a high-level flowchart illustrating various methods and techniques to implement indexing an auxiliary data set for adapting a pre-trained machine learning language model using a target data set, according to some embodiments.

FIG. 6 is a high-level flowchart illustrating various methods and techniques to implement indexing an auxiliary data set for adapting a pre-trained machine learning language model using a target data set, according to some embodiments. As indicated at 610, an auxiliary data set may be identified for adapting pre-trained machine learning model (s), in some embodiments. For example, as discussed above with regard to FIG. 3, request to adapt a pre-trained machine learning model or other requests to configure performance of adaptation may select one auxiliary data set from amongst many different auxiliary data sets. In some embodiments, the size, cost, or time to index or retrieve items from an auxiliary data set may influence which auxiliary data set may be selected. In some embodiments, the content of the auxiliary data set (e.g., specialized data set or large, heterogeneous data set) may influence which auxiliary data set is selected. In some embodiments, a default auxiliary data set may be identified that corresponds to the pre-trained machine learning model that is being adapted. For instance, if multiple different pre-trained machine learning models can be adapted, then each of the pre-trained machine learning models can have a corresponding auxiliary data set (although multiple models could share the same auxiliary data set).

As indicated at 620, an index of items in the auxiliary data set for retrieving items from the auxiliary data set according to similarity with a given item of a target data set, in some embodiments. For example, an index of items may be generated according to the feature that are generated for target data set items by the pre-trained machine learning model. If, for example, the pre-trained machine learning model performs image classification, then embeddings generated for images, such as target data items that are images, may also be generated for the auxiliary data set (e.g., generating an embedding for each image or a subset of images in the auxiliary data set). In some embodiments, auxiliary data sets may be multi-modal, such as a text-image set of items, video-text, audio-image, audio-text-image, or various other combinations. In such embodiments, similarity indexes may be generated for one or multiple of the modes of items. For instance, a similarity index may be generated for text and another similarity index may be generated for the images of the auxiliary data set.

As indicated at 630, the index of items in the auxiliary data set may be stored, in some embodiments. For example, the index may be stored in a database, cache, or other type of data store that supports reads on the index in order to identify similar items in the auxiliary data set for a given target item without having to access the items of the auxiliary data set directly. Different types of queries, reads, or other analyses may be requested according to the implementation of the similarity index. For example, a nearest neighbor search that uses measures such as cosine or other distance measurements to determine similarity, the data store for the index may support or implement a nearest neighbor search function (or other type of search functionality) that corresponds to the type of similarity search that is performed for retrieving auxiliary items as part of adapting a pre-trained machine learning model.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
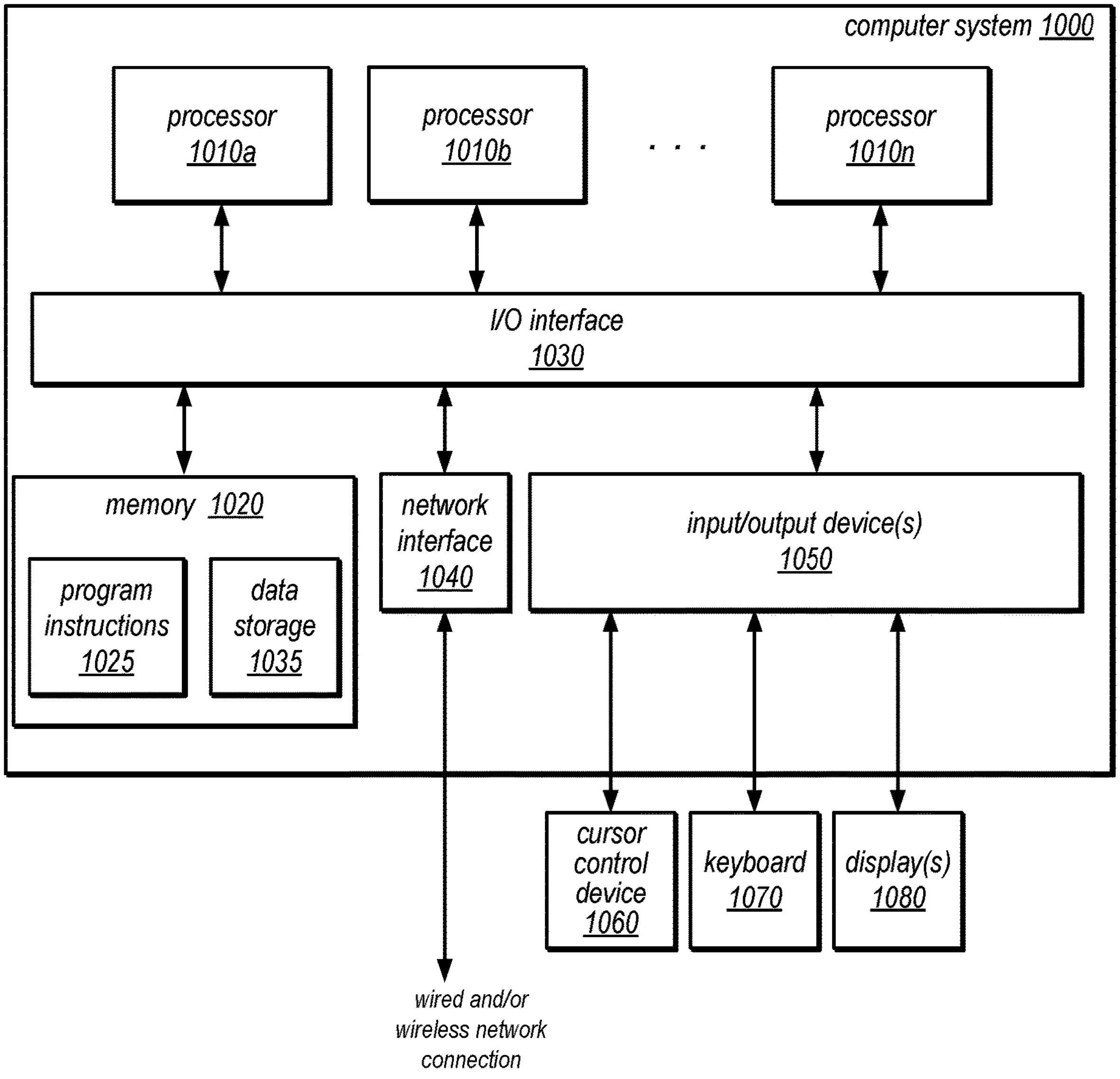
FIG. 7 illustrates an example system to implement the various methods, techniques, and systems described herein, according to some embodiments.

Embodiments of adapting pre-trained machine learning models using target data sets as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a plurality of computing devices, respectively comprising a processor and at least one memory, that implement a machine learning service, configured to:

receive, via an interface, request to adapt a pre-trained machine learning model to a target data set;

adapt the pre-trained machine learning model using the target data set, wherein to adapt the pre-trained machine learning model, the machine learning service is configured to:

retrieve, using an index generated for an auxiliary data set, a plurality of auxiliary items from the auxiliary data set according to at least one target item from the target data set, to be used as negative examples of the at least one target item;

identify respective labels for the plurality auxiliary items based, at least in part, on one or more labels identified for one or more target items of the target data set;

retain those auxiliary items of the plurality of auxiliary items with respective labels that do not match a label identified for the at least one target item;

apply a contrastive loss function to respective embeddings of the auxiliary items and an embedding of the at least one target item, wherein applying the contrastive loss function updates a backbone of the pre-trained machine learning model; and apply a cross entropy loss function to a predicted label for the target item determined by a classifier of the pre-trained machine learning model and the label identified for the at least one target item, wherein applying the cross entropy loss function updates the classifier of the pre-trained machine learning model; and store the adapted machine learning model.

2. The system of claim 1, wherein the request specifies train-time adaptation and wherein to identify the respective labels for the plurality auxiliary items, the machine learning service is configured to use respective ground truth labels provided for the one or more target items of the target data set.

3. The system of claim 1, wherein the request specifies test-time adaptation and wherein to identify the respective labels for the plurality auxiliary items, the machine learning service is configured to generate pseudo labels based on logits stored for the one or more target items of the target data set.

4. The system of claim 1, wherein the machine learning service is further configured to deploy the adapted machine learning model on one or more host computing resources to make the adapted machine learning model available for generating inferences upon request.

5. A method, comprising:

receiving, via an interface of a machine learning system, a target data set for adapting a pre-trained machine learning model; and adapting, by the machine learning system, the pre-trained machine learning model using the target data set, comprising:

retrieving a plurality of auxiliary items from an auxiliary data set based, at least in part, on at least one target item from the target data set, to be used as negative examples of the at least one target item;

identifying respective labels for the plurality auxiliary items based, at least in part, on one or more labels identified for one or more target items of the target data set;

retaining those auxiliary items of the plurality of auxiliary items with respective labels that do not match a label identified for the at least one target item;

applying a contrastive loss function to respective embeddings of the auxiliary items and an embedding of the at least one target item, wherein applying the contrastive loss function updates a backbone of the pre-trained machine learning model; and applying a cross entropy loss function to a predicted label for the target item determined by a classifier of the pre-trained machine learning model and the label identified for the at least one target item, wherein applying the cross entropy loss function updates the classifier of the pre-trained machine learning model.

6. The method of claim 5, wherein identifying the respective labels for the plurality auxiliary items uses respective ground truth labels provided for the one or more target items of the target data set.

7. The method of claim 5, wherein identifying the respective labels for the plurality auxiliary items comprises generating pseudo labels based on logits stored for the one or more target items of the target data set.

8. The method of claim 5, wherein retrieving the plurality of auxiliary items from the auxiliary data set comprises discarding one or more of the auxiliary items determined to be redundant with respect to an already retrieved auxiliary item.

9. The method of claim 5, further comprising generating an index of items in the auxiliary data set for search according to similarity to a given item, wherein the index of items is used to retrieve the plurality of auxiliary items and wherein the given item is the at least one target item.

10. The method of claim 5, further comprising receiving a request that specifies the auxiliary data set out of a plurality of available auxiliary data sets for adapting the pre-trained machine learning model.

11. The method of claim 5, further comprising generating augmented versions of the plurality of auxiliary items and the at least one target item, wherein the augmented versions of the plurality of auxiliary items and the target item are used for the identifying, the retaining, the applying of the contrastive loss, and the applying of the cross entropy loss.

12. The method of claim 5, wherein the machine learning system is an image recognition service offered as part of a provider network, wherein the pre-trained machine learning model is an image recognition model offered as part of the image recognition service and wherein the target data set is specified as part of a request to adapt the image recognition model to the target data set.

13. The method of claim 5, further comprising deploying the adapted machine learning model on one or more host computing resources to make the adapted machine learning model available for generating inferences upon request.

14. One or more non-transitory, computer-readable storage media, storing program instructions that when executed on or across one or more computing devices cause the one or more computing devices to implement:

receiving, via an interface, a target data set for adapting a pre-trained machine learning model;

adapting the pre-trained machine learning model using the target data set, comprising:

retrieving a plurality of auxiliary items from an auxiliary data set based, at least in part, on at least one target item from the target data set, to be used as negative examples of the at least one target item;

identifying respective labels for the plurality auxiliary items based, at least in part, on one or more labels identified for one or more target items of the target data set;

retaining those auxiliary items of the plurality of auxiliary items with respective labels that do not match a label identified for the at least one target item;

applying a contrastive loss function to respective embeddings of the auxiliary items and an embedding of the at least one target item, wherein applying the contrastive loss function updates a backbone of the pre-trained machine learning model; and applying a cross entropy loss function to a predicted label for the target item determined by a classifier of the pre-trained machine learning model and the label identified for the at least one target item, wherein applying the cross entropy loss function updates the classifier of the pre-trained machine learning model; and storing the adapted machine learning model.

15. The one or more non-transitory, computer-readable storage media of claim 14, wherein identifying the respective labels for the plurality auxiliary items uses respective ground truth labels provided for the one or more target items of the target data set.

16. The one or more non-transitory, computer-readable storage media of claim 14, wherein, in identifying the respective labels for the plurality auxiliary items, the program instructions cause the one or more computing devices to implement generating pseudo labels based on logits stored for the one or more target items of the target data set.

17. The one or more non-transitory, computer-readable storage media of claim 14, wherein in retrieving the plurality of auxiliary items from the auxiliary data set, the program instructions cause the one or more computing devices to further implement utilizing a second data modality different than a first data modality of the pre-trained machine learning model to identify the plurality of auxiliary items to retrieve from the auxiliary data set.

18. The one or more non-transitory, computer-readable storage media of claim 14, storing further program instructions that when executed on or across the one or more computing devices, cause the one or more computing devices to further implement receiving a request that specifies the auxiliary data set out of a plurality of available auxiliary data sets for adapting the pre-trained machine learning model.

19. The one or more non-transitory, computer-readable storage media of claim 14, storing further program instructions that when executed on or across the one or more computing devices, cause the one or more computing devices to further implement generating augmented versions of the plurality of auxiliary items and the target item, wherein the augmented versions of the plurality of auxiliary items and the at least one target item are used for the identifying, the retaining, the applying of the contrastive loss, and the applying of the cross entropy loss.

20. The one or more non-transitory, computer-readable storage media of claim 14, storing further program instructions that when executed on or across the one or more computing devices, cause the one or more computing devices to further implement deploying the adapted machine learning model on one or more host computing resources to make the adapted machine learning model available for generating inferences upon request.

* * * * *